United States Patent [19]
Cepulis

[11] Patent Number: 5,860,142
[45] Date of Patent: Jan. 12, 1999

[54] METHOD AND APPARATUS FOR MAPPING THE MEMORY SYSTEM OF A COMPUTER FOR MAXIMIZING MEMORY USAGE

[75] Inventor: Darren J. Cepulis, Montgomery County, Tex.

[73] Assignee: Compaq Computer Corporation, Houston, Tex.

[21] Appl. No.: 775,023

[22] Filed: Dec. 27, 1996

[51] Int. Cl.⁶ .................................................. G06F 12/00
[52] U.S. Cl. ...................... 711/202; 711/170; 711/173; 707/205; 707/206
[58] Field of Search ................... 707/205, 206; 711/170, 173, 202

[56] References Cited

U.S. PATENT DOCUMENTS

| | | | |
|---|---|---|---|
| 4,387,365 | 6/1983 | Berry et al. | 364/731 |
| 5,566,321 | 10/1996 | Pase et al. | 711/153 |
| 5,649,127 | 7/1997 | Hang | 395/307 |
| 5,668,968 | 9/1997 | Wu | 711/3 |
| 5,717,876 | 2/1998 | Robertson | 395/309 |

*Primary Examiner*—Tod R. Swann
*Assistant Examiner*—Mehdi Namazi
*Attorney, Agent, or Firm*—Akin, Gump, Strauss, Hauer & Feld, L.L.P.

[57] ABSTRACT

A computer system including a host bus, a processor that asserts addresses between a lowest address and a highest address, at least one peripheral component interconnect (PCI) bus coupled to the host bus, at least one PCI device coupled to the PCI buses, and system memory devices that are mapped between the lowest address and an upper system memory address defined by PCI memory. Each PCI device has memory that is mapped in reverse and descending order in the PCI memory, which is located between a predetermined upper PCI memory address and the upper system memory address below the upper PCI memory address. The determination of the upper system memory through the reverse and descending mapping enables increased usage of system memory. The PCI devices coupled through each host PCI bus and its corresponding subordinate PCI buses are mapped together, resulting in a segment in the PCI memory for each host PCI bus. Further, for each host PCI bus and its subordinate PCI buses, if any, the non-prefetchable memory is grouped together and then the prefetchable memory is grouped together resulting in two sections within each segment. Such mapping provides efficient mapping of PCI devices, resulting in even greater usage of system memory.

20 Claims, 5 Drawing Sheets

METHOD AND APPARATUS FOR MAPPING THE MEMORY SYSTEM OF A COMPUTER FOR MAXIMIZING MEMORY USAGE

FIELD OF THE INVENTION

The present invention relates generally to the field of computer systems, and more particularly to a method and apparatus for efficient mapping of the memory system of a computer for maximizing memory usage.

DESCRIPTION OF THE RELATED ART

The amount of system memory available in a computer system is usually limited only by available technology. Heretofore, dynamic random access memory (DRAM) memory boards had a practical limitation of approximately 128 megabytes (MB) for high-end personal computers (PCs) used as workstations or server systems. The present invention is demonstrated with IBM-compatible PCs, although it is not limited to such and may be applied to any type of computer system. For space and power considerations, a total of up to 16 memory slots were provided for memory boards, resulting in a practical maximum system memory size of 2 gigabytes (GB).

Several processors, such as the 80386, i486, Pentium™ or P6 processors manufactured by the Intel Corporation (Intel), or Motorola's 68000 series of processors, and many other known 32-bit processors, are capable of addressing up to 4 GB ($2^{32}$=4 GB) of memory. Typical operating systems are also designed based on a memory system size of 4 GB. A processor is often designed to begin executing instructions at its highest addressable location, which is 4 GB=FFFFFFFFh (an "h" suffix denotes hexadecimal number notation) for a processor with 32 address bits. For this reason, a system read only memory (ROM) is located at the highest addressable location, which incorporates the system management routines executed upon reset or power-up, including power-on self-test (POST), normal and advanced basic input/output (BIOS) routines and other run-time utilities as needed or desired. Other devices including programmable interrupt controllers (PICs) or advanced PICs (APICs) are located in upper memory with the system ROM. A typical space allocation for both system ROM and one or more APIC devices is the upper 20 MB of the total 4 GB of memory, beginning at address FEC00000h. A "hole" in the memory is allowed below the address 16 MB (or 1000000h) in lower memory for devices associated with an expansion bus, such as the Industry Standard Architecture (ISA) or the extended ISA (EISA).

A computer system may include a plurality of Peripheral Component Interconnect (PCI) buses for interfacing PCI type devices. One or more host PCI buses are coupled to the host processor bus through respective host-PCI bridge devices. Also, a certain number of subordinate PCI buses are allowed as needed, where each subordinate PCI bus is coupled to any host PCI bus through a PCI-PCI bridge. For high-end PC systems, there are usually two host PCI buses mounted on the motherboard, typically referred to as the primary and secondary PCI buses, respectively, which are considered "peer" PCI buses with respect to each other. Subordinate buses are typically provided on PCI plug-in adapter cards or the like, which include a PCI-PCI bridge for interfacing a host PCI bus through an card connector.

The system ROM typically mapped PCI devices into memory space in ascending order beginning at the address 3 GB (C0000000h) and continued upwards in memory towards a maximum address of 4 GB−1 (FEBFFFFFh) until all PCI devices were mapped. To achieve the PCI device mapping, all of the PCI buses were first numbered in consecutive and ascending order beginning with the primary PCI bus, followed by any subordinate PCI buses of the primary PCI bus, followed by the secondary PCI bus, which was followed by any subordinate PCI buses of the secondary PCI bus. The PCI device mapping was performed in a corresponding consecutive and increasing order beginning with any devices coupled the primary bus until all PCI buses were mapped. On the average, each PCI device only required approximately 1–2 MB, which might otherwise result in a total system average of approximately 32 MB of memory. Nonetheless, the PCI mapping was typically not an efficient mapping, so that the amount of actual space "consumed" for PCI devices was substantially greater than 32 MB. For example, some mapping schemes requested a minimum of 32 MB of prefetchable memory space per device, which consumed a substantial amount of space. Such inefficient mapping, however, was relatively inconsequential because there was a significant amount of room in this range (1 GB).

A the time of this disclosure, Extended Data-Out (EDO) is a dynamic RAM (DRAM) chip technology which improves memory performance by 10–15% over equivalent Fast Page Mode (FPM) devices currently available. EDO memory boards configured as dual in-line memory modules (DIMMs) are available with up to 256 MB of memory. System memory may be extended to a total of 4 GB or more with EDO DIMMs or similar technology using the same number of memory slots and which consumes approximately the same amount of power. However, PCI devices are currently inefficiently mapped at an inconvenient location and consume a significant amount of space. It is desired to achieve a usable system memory as close to the full 4 GB as possible considering other device mappings.

SUMMARY OF THE INVENTION

A computer system according to the present invention includes a host bus, a processor that asserts addresses between a lowest address and a highest address, at least one peripheral component interconnect (PCI) bus coupled to the host bus, at least one PCI device coupled to the PCI buses, and system memory devices that are mapped between the lowest address and an upper system memory address defined by PCI memory. Each PCI device has memory that is mapped in reverse and descending order in the PCI memory, which is located between a predetermined upper PCI memory address and the upper system memory address below the upper PCI memory address.

The processor is preferably a 32-bit Pentium™ processor or the like which is capable of addressing up to four gigabytes (4 GBs) of memory space. The system memory is preferably implemented with DRAM modules mounted on memory boards, where the DRAM is preferably implemented using Extended Data-Out (EDO) DRAMs. In this manner, the system memory may be implemented with up to 16 memory boards, each holding 256 MB of memory. The computer preferably includes a non-volatile memory device, such as a system ROM, and interrupt logic, such as one or more APICs (advanced programmable interrupt controllers), which is mapped in the uppermost memory space and that determines the upper PCI memory address. In this manner, the PCI memory is mapped just below the system devices and mapped in reverse and descending order to increase the available memory space for system memory.

Preferably, the computer system includes several PCI buses, such as a primary host PCI bus and a secondary host PCI bus, although more host PCI buses are contemplated. Each host PCI bus is coupled to the host bus of the computer system with a corresponding host-PCI bridge device. The memory of the PCI devices coupled to the highest numbered host PCI bus is mapped first, followed by the memory of the PCI devices coupled to the second highest PCI host bus, and so on, and ending with the memory of the PCI devices coupled to the primary host PCI bus. In this manner, the PCI memory is divided into one or more segments mapped in descending order, where each segment corresponds to a host PCI bus.

The computer system may further include one or more subordinate PCI buses coupled behind any of the host PCI buses. Subordinate PCI buses are coupled to a host PCI bus through a PCI-PCI bridge device. Subordinate buses may be implemented on the motherboard of the computer system, although they are usually coupled through PCI adapter cards plugged into PCI slots of the host PCI bus. In either event, for each host PCI bus, the PCI devices coupled to subordinate PCI buses are mapped first followed by any PCI devices coupled to the corresponding host PCI bus. Furthermore, the memory of each of the PCI devices is typically divided into non-prefetchable memory and prefetchable memory. In the preferred embodiment, the non-prefetchable memory of all of the PCI devices coupled through each host PCI bus and its subordinate PCI buses, if any, is mapped first followed by the prefetchable memory of the same devices. In this case, each of the segments of the PCI memory is further divided into two sections of non-prefetchable memory and prefetchable memory.

A method of mapping a memory system of a computer according to the present invention includes steps of identifying all PCI buses coupled through the host bus including any host PCI buses and any subordinate PCI buses, enumerating the PCI buses, and allocating and initializing the memory of each PCI device coupled to the PCI buses within a PCI memory location starting with the highest numbered PCI host bus and its subordinate PCI buses, if any, and continuing in reverse order of PCI host buses and ending with a primary host PCI bus and its subordinates, and progressing in descending order in the PCI memory location beginning at an upper PCI memory address below the highest address and ending at a lower PCI address below the upper PCI memory address.

For each host PCI bus, the step of allocating and initializing may further include a step of allocating the memory of PCI devices coupled to any subordinate PCI buses first followed by the memory of PCI devices coupled to the corresponding host PCI bus. The allocating and initializing step may further include a step of allocating non-prefetchable memory first followed by prefetchable memory. Also, the allocating step may further include steps of mapping at least one system device, such as a system ROM, in the topmost portion of the memory space between the highest address and a lower address below the highest address, and determining the upper PCI memory address as the next address below the lower address of the system device(s). After allocating and initializing, the method may further include a step of mapping system memory between the lowest address and the lower PCI address of the memory space.

A method and system for mapping the memory system of a computer according to the present invention enables efficient and maximum use of the system memory by mapping PCI devices in reverse and descending order in upper memory. This enables determination of a maximum system dynamic memory address, where the system dynamic memory is correspondingly mapped between the lowest address (00000000h) and the determined maximum dynamic memory address. The mapping is further improved by grouping non-prefetchable memory and prefetchable memory, which increases the maximum address by a substantial amount. This maximum address is well above the previous maximum address corresponding to 2 GB, and is also well above the address corresponding to 3 GB where PCI devices were mapped in prior art systems. Such mapping enables maximum use of new DRAM technologies, such EDO memory modules, which allow production of 256 MB memory boards. Using such memory boards, the system memory may be extended to a total of 4 GB using the same number of memory slots and consuming approximately the same amount of power. With the present invention, a computer system is able to use an average of 3.9 GB or more of the total 4 GB.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
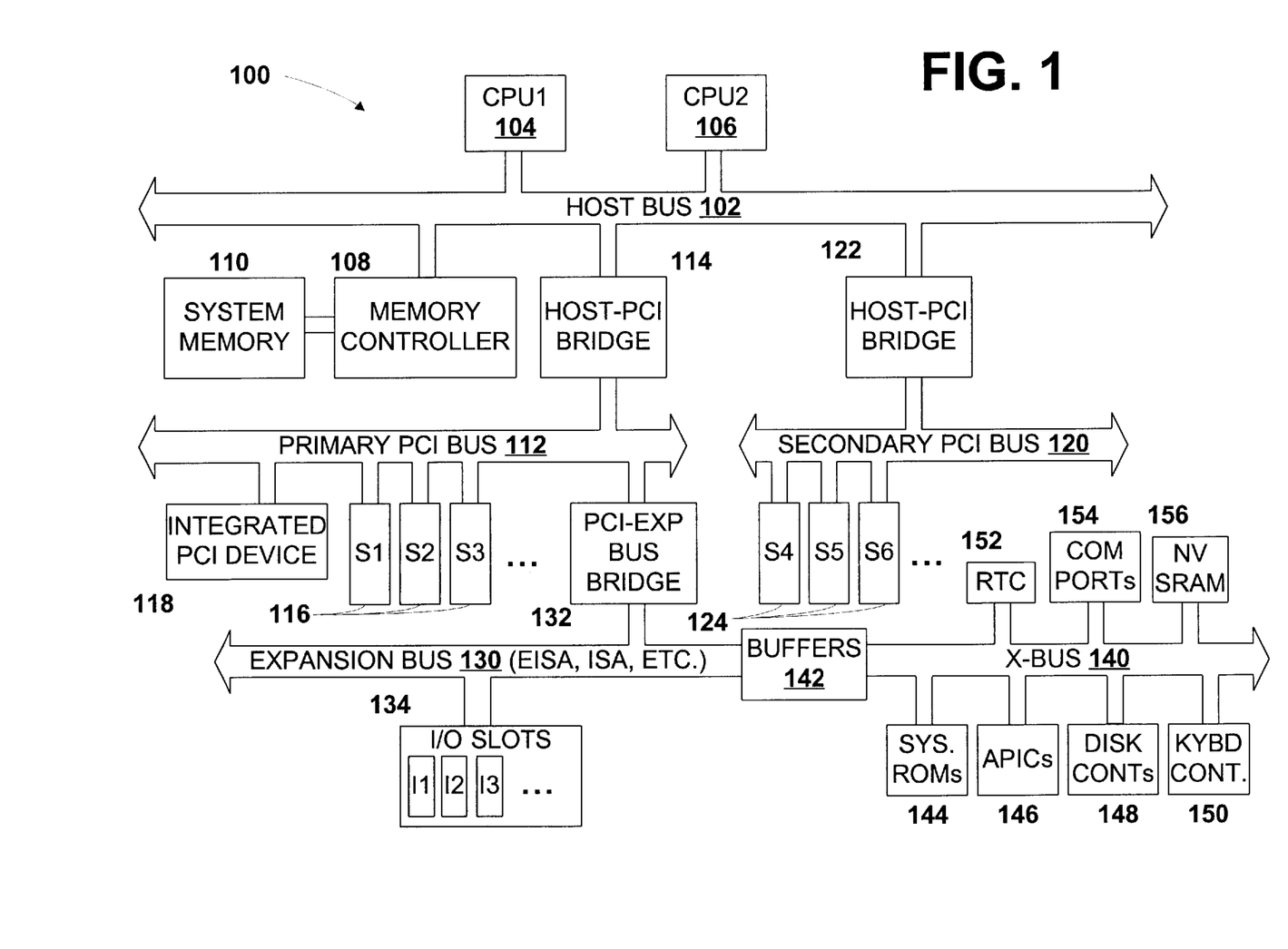
FIG. 1 is a system block diagram of a computer system incorporating a memory system implemented according to the present invention.

Referring now to FIG. 1, a system block diagram is shown of the motherboard of a computer system 100 incorporating a memory system implemented according to the present invention. The computer system 100 is preferably an IBM-compatible, high-end personal computer (PC) system or the like typically used for workstations or server systems. The computer system 100 includes a host bus 102, which is coupled to one or two central processing units (CPUs) CPU1 104 and CPU2 106. The CPUs 104, 106 preferably include 32-bit Pentium™ CPUs by Intel and supporting circuitry. The host bus 102 preferably includes 32 address lines and 64 data lines as compatible with Pentium™ processors. Although the present invention is illustrated with a multiprocessor, IBM-compatible type PC system, it is understood that the present invention is applicable to other types of computer systems and processors as known to those skilled in the art.

A memory controller 108 is coupled to the host bus 102 for interfacing system memory 110. The system memory 110 is preferably implemented with one or more memory boards plugged into compatible memory slots on the motherboard. Each memory board is preferably implemented using Extended Data-Out (EDO) dynamic random access memory (DRAM) modules for a total of 256 megabyte (MB) of memory per board. For a motherboard including up to sixteen (16) memory slots, the system memory 110 is expandable to a total of 4 GB of memory. Any memory scheme for implementing 4 GB of system memory space is contemplated. As described further below, several system devices are mapped into the 4 GB memory space resulting in some unusable memory area. Each of the CPUs 104, 106 are capable of addressing memory and devices mapped between 00000000h and FFFFFFFFh using a 32-bit address bus.

The computer system 100 preferably includes a primary PCI bus 112 coupled to the host bus 102 via a Host-PCI bridge 114. The primary PCI bus 112 is typically implemented with one or more PCI slots 116, individually labeled S1, S2, S3, and so on. Each of the PCI slots 116 are configured to receive compatible PCI adapter cards incorporating one or more PCI devices as known to those skilled in the art. Typical PCI devices include network interface cards (NICs) disk controllers such as a SCSI (small computer systems interface) disk controller, video or graphics controllers, etc. One or more integrated PCI devices 118 may be integrated onto the motherboard itself and coupled directly to the primary PCI bus 112.

A secondary PCI bus 120 is provided and coupled to the host bus 102 through another Host-PCI bridge 122. The secondary PCI bus 120 is provided for further PCI expansion capability and includes one or more slots 124, which are consecutively numbered above the PCI slots S1–S3, such as PCI slots S4, S5, S6, etc. Although only six (6) PCI slots are shown, more PCI slots may be added to either PCI bus 112, 120 as needed or desired. Since the PCI buses 112 and 120 are both relatively independent and coupled through the host bus 102, they are referred to as "peer" PCI buses with respect to each other. Additional host peer PCI buses may be provided on the motherboard and coupled to the host bus 102 as desired. Each of the host peer PCI buses, such as the PCI buses 112 and 120 shown, may include one or more subordinate PCI buses coupled through PCI-PCI bridge devices (FIG. 2A) as known to those skilled in the art. Subordinate PCI buses may be incorporated directly on the motherboard, but are usually provided on PCI adapter cards plugged into any one or more of the PCI slots S1–S6.

The computer system 100 preferably includes an expansion bus 130 coupled to the primary PCI bus 112 through a PCI-Expansion bus bridge 132. The expansion bus 130 is any one of many different types, including the industry standard architecture (ISA) bus, also referred to as the AT bus, the extended industry standard architecture (EISA) bus, or the microchannel architecture (MCA) bus, among others. For high-end PC systems, the EISA bus is preferred because it provides greater performance, where the PCI-expansion bus bridge 132 is a PCI-EISA bridge. The expansion bus 130 preferably includes one or more expansion or input/output (I/O) slots 134, individually labeled I1, I2, I3, etc. Various devices incorporated on I/O adapter cards may be coupled to the expansion bus 130 through the I/O slots 134, including expansion bus memory, modems, disk controllers, sound cards, NICs and various other types of controllers as known to those skilled in the art.

The expansion bus 130 also couples to a peripheral expansion bus referred to as the X-bus 140 through a set of bus buffers 142. The X-bus 140 is used for connecting various system components and peripherals to the computer system 100, such as a system ROM 144 comprising one or more ROM modules, one or more APICs (advanced programmable interrupt controllers) 146, one or more disk controllers 148 (such as a floppy disk controller (FDC) and a hard disk controller (HDC)), a keyboard controller 150, a real time clock (RTC) and timers 152, communication ports 154, non-volatile static random access memory (NVSRAM) 156, as well as other peripherals not shown, such as a direct memory access (DMA) system, diagnostics ports, command/status registers, battery-backed CMOS memory, etc.

Figure 2A:
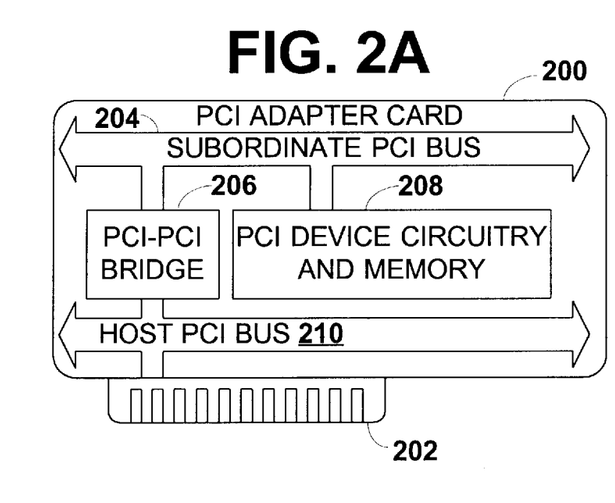
FIGS. 2A and 2B are simplified block diagrams of PCI cards for plugging into PCI slots shown in FIG. 1.

FIG. 2A is a simplified block diagram illustrating one configuration of a PCI adapter card 200. The PCI adapter card 200 includes a compatible edge connector 202 configured to interface any of the PCI slots S1–S6 116, 124, and is added to expand the capabilities of the computer system 100 by adding functionality, such as NICs, disk controllers, video or graphics controllers, etc. A PCI device circuitry and memory block 208 represents all of the logic, circuitry and memory functions of the PCI adapter card 200 for adding the desired capabilities and functionality. The PCI device circuitry and memory block 208 is coupled to a subordinate PCI bus 204, which is further coupled to a host PCI bus 210 through a PCI-PCI bridge 206. The host PCI bus 210 is connected directly to the signals of the connector 202 and thus is a direct electrical extension of a particular PCI bus to which the PCI adapter card 200 is connected. Thus, the host PCI bus 210 is not considered a separate PCI bus for purposes of the present invention. For example, the host PCI bus 210 is an extension of the primary PCI bus 112 if plugged into any one of the PCI slots S1–S3, or is an extension of the secondary PCI bus 120 if plugged into any one of the PCI slots S4–S6. The subordinate PCI bus 204, however, is isolated through the PCI-PCI bridge 206 and thus is considered a separate, though subordinate, PCI bus behind a particular host PCI bus.

Figure 2B:
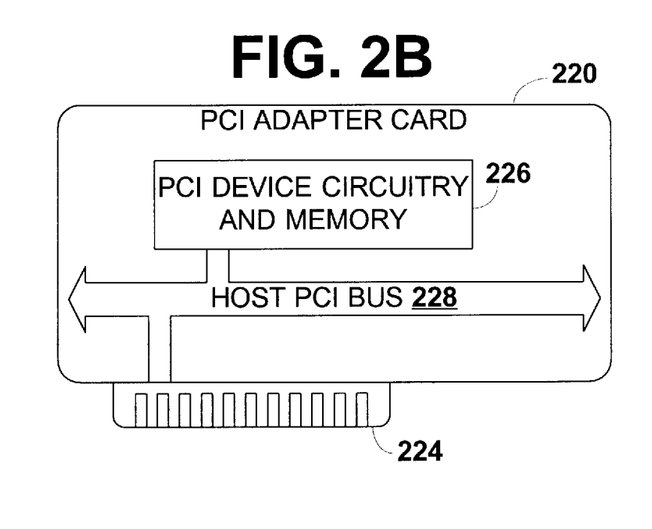

FIG. 2B is a simplified block diagram of a PCI adapter card 220 representing an alternative PCI adapter card configuration. In a similar manner as the PCI adapter card 200, the PCI adapter card 220 includes a compatible edge connector 224 for interfacing any of the PCI slots S1–S6 116, 124, and is also added to expand the capabilities of the computer system 100 by adding functionality. A PCI device circuitry and memory block 226 represents all of the logic, circuitry and memory functions of the PCI adapter card 220 for adding the desired capabilities and functionality. The PCI device circuitry and memory block 226, however, is coupled directly to a host PCI bus 228, which is similar to the host PCI bus 210. In particular, the host PCI bus 228 is connected directly to the signals of the connector 224, and thus is not considered a separate PCI bus for purposes of the present invention. For example, if plugged into any one of the PCI slots S1–S3, the host PCI bus 228 is an extension of the primary PCI bus 112, so that the PCI device circuitry and memory block 226 is electrically coupled directly to the PCI bus 112 in a similar manner as the integrated device 118.

The PCI adapter cards 200 and 220 are representative only and do not illustrate all of the possible variations for adding functionality through a PCI bus of a computer system. For example, several subordinate PCI buses may be implemented on a single PCI adapter card, either in a parallel or peer configuration or in a stacked or multi-layer subordinate configuration.

Figure 3:
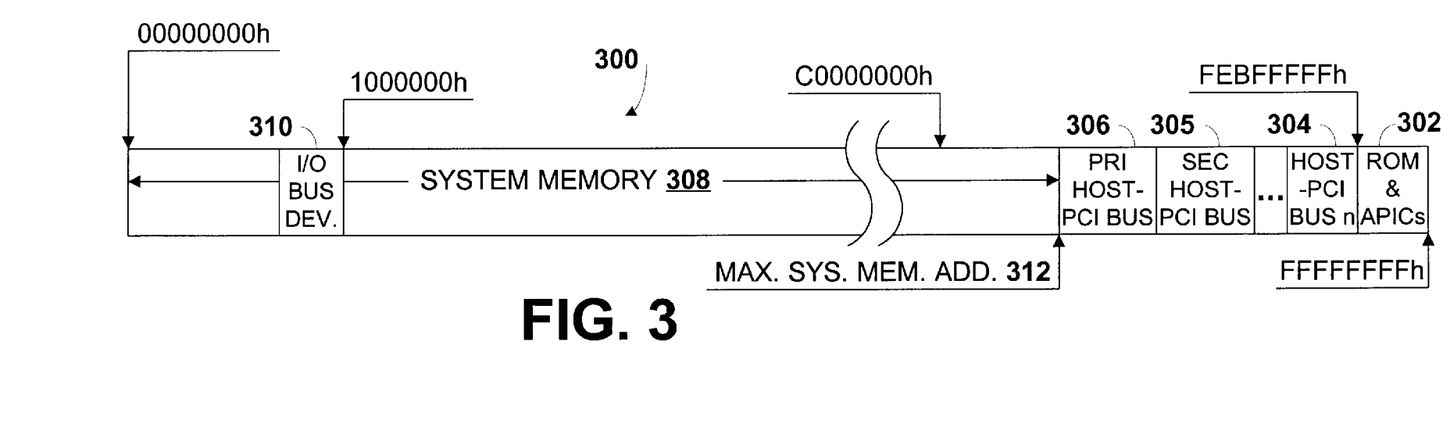
FIG. 3 is a representative diagram illustrating an efficient mapping of a memory system according to the present invention for the computer system shown in FIG. 1.

FIG. 3 is a representative diagram illustrating a mapping according to the present invention of the memory system 300 of the computer system 100. The entire memory system 300 is mapped into 4 GB of memory space between addresses 00000000h and FFFFFFFFh. The system ROM 144 and the APIC(s) 146 are preferably mapped in the upper-most memory segment 302 beginning at address FEC00000h and thus consume the upper 20 MB of memory space. I/O devices associated with the expansion bus 130, such as an EISA bus, are mapped into a memory space 310, which forms a hole in memory below 16 MB or below address 1000000h. The memory space 310 typically consumes approximately 1–2 MB of memory, and thus is mapped between 14–16 MB.

According to the present invention, the PCI devices coupled through the PCI buses 112, 120 and any other host PCI buses are mapped in descending and reverse order beginning at address FEBFFFFFh, which is just below the memory segment 302 at FEC00000h. For a multiple PCI host bus system including "n" PCI buses, the PCI devices associated with the highest PCI bus "n" are mapped first into a memory segment 304 just below the memory segment 302. Then, the PCI devices associated with the next highest PCI bus "n–1" are mapped second into a next, lower memory segment just below the memory segment 304 and so on. Eventually, the PCI devices associated with the secondary PCI bus 120 are mapped into a memory segment 305 somewhere below the memory segment 304 and the PCI devices associated with the primary PCI bus 120 are mapped last into a memory segment 306 just below the memory segment 305. Of course, for a typical dual PCI bus system including only the primary and secondary PCI buses 112, 120, only the memory segments 305 and 306 are needed and are located just below the memory segment 302. It is noted that the term "memory segment" is used to denote a mapped memory space or location of any size.

When mapped efficiently according to the present invention, each PCI device consumes only about 1–2 MB resulting in a system average of approximately 32 MB of memory segment 304, 306 for PCI devices. The memory associated with the system memory 110 is mapped into the remaining memory space 308 between addresses 00000000h and a maximum system memory address 312. Assuming the memory segments 302, 304, . . . 305 and 306 collectively consume approximately 52 MB of memory space, the maximum system memory address 312 is close to FCC00000h, which is well above the 3 GB memory address C0000000h. Thus, the memory space 308 for system memory 110 is still over 3.9 GB even allowing for the memory consumed by the memory space 310. In this manner, the present invention enables the use of almost all of the available additional memory using 256 MB memory boards for the system memory 110.

Figure 4:
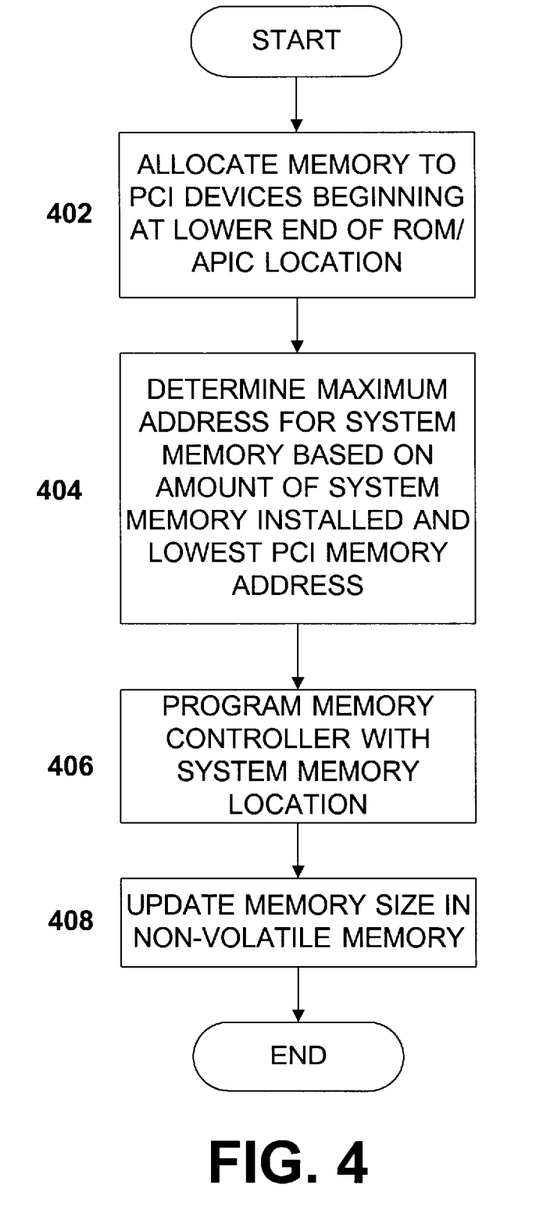
FIG. 4 is a flowchart diagram illustrating a procedure performed by a processor for mapping and determining system memory space.

Referring now to FIG. 4, a flowchart diagram is shown illustrating a procedure performed by either one (or possibly both) of the CPUs 104, 106 for mapping and determining the memory system 300 of the computer system 100. Generally, one CPU, such as the CPU1 104, performs the power-on self-test (POST) procedures upon power up or reset to initialize the computer system 100. In that case, the CPU1 104 performs the routines stored in the system ROM 144 to execute POST, normal and advanced basic input/output (BIOS) routines and other run-time utilities as needed or desired. Eventually, the CPU1 104 performs step 402 by allocating memory to PCI devices coupled through the PCI buses 112, 120, where the PCI memory allocation starts at memory address FEBFFFFFh and progresses in reverse and descending order. This procedure will be described more fully below with reference to FIG. 5. Operation proceeds from step 402 to step 404, where the maximum system memory address 312 is determined based on the amount of system memory installed and the next address below the lowest PCI memory address of memory segment 306.

Assuming that a full 4 GB of DRAM is installed on the motherboard, the maximum system memory address 312 depends upon the number and size of the PCI devices. For a total of approximately 32 MB of PCI memory space, the maximum system memory address 312 is in the neighborhood of FCC00000h leaving over 3.9 GB for the memory space 308. Even if the PCI memory space consumes approximately 100 MB, the memory space 308 for the system memory 110 is approximately 3.88 GB. Of course, if only 15 of the 16 256 MB memory boards are installed, the memory space 308 is 3.75 GB to address F0000000h, leaving a full 236 MB of memory space for PCI devices, which is usually significantly more than necessary.

Once the maximum system memory address 312 is determined in step 404, operation eventually proceeds to step 406 to program the memory controller 108 with the maximum system memory address 312 to identify the location and size of the memory space 308. Operation then proceeds to step 408 to update non-volatile memory, such as the NVSRAM 156, a battery-backed CMOS memory or the like. In this manner, the computer system 100 is programmed to use the available amount of DRAM of the system memory 110.

Figure 5:
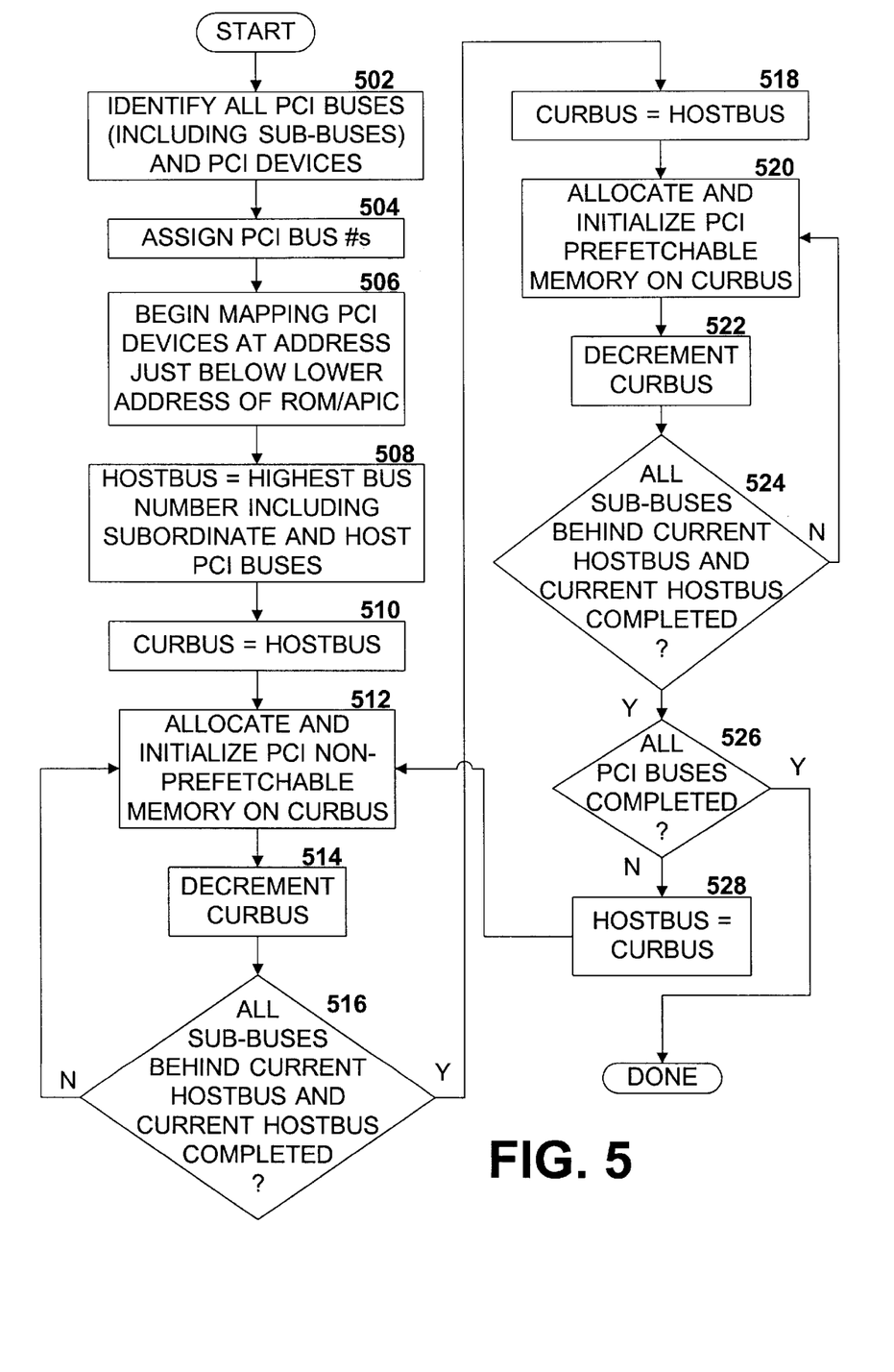
FIG. 5 is a flowchart diagram illustrating efficient mapping of PCI space according to the present invention.

Referring now to FIG. 5, a flowchart diagram is shown illustrating an efficient mapping of the PCI space according to the present invention, as indicated at step 402 of FIG. 4. As known to those skilled in the art and familiar with the PCI specifications, each PCI device includes an identification (id) register (not shown) or the like, which, when queried by the CPU1 104, specifies the total amount of PCI needed for that PCI device for either prefetchable memory or non-prefetchable memory or both. The CPU 1 104 determines where to place the device in system memory and correspondingly assigns an address to, and programs the assigned address into, the device.

Non-prefetchable PCI memory is usually implemented using less memory with significantly slower memory devices than the memory devices used for prefetchable PCI memory. Non-prefetchable is usually only a few bytes or so and accessed only one or more bytes at a time by the requesting processor, such as the CPU1 104 or the CPU2 106. For example, for some PCI devices, the non-prefetchable memory size is on the order of 256 bytes or so. Prefetchable memory of any necessary size, such as several tens, hundreds, thousands, millions, etc. of bytes is typically implemented in faster buffer devices and is usually bursted across the associated PCI buses when transferred to the requesting processor. Prefetchable memory is typically on the order a several MBs of data. It is noted that each PCI device may have any amount of either non-prefetchable memory or prefetchable memory or both types depending upon the particular function or application implemented. Since prefetchable memory is typically substantially larger and often must be placed at particular page boundaries, it is desired to group together all of the non-prefetchable memory for all PCI devices associated with any particular PCI bus, and then to group the prefetchable memory for the same devices.

At a first step 502, the CPU1 104 identifies all of the PCI buses in the computer system 100, including the primary PCI bus 112, the secondary PCI bus 120, any other host PCI buses on the motherboard, and all subordinate buses coupled through the host PCI buses, if any, such as the subordinate bus 204 on the PCI adapter card 200. In general, host PCI buses are those coupled to the host bus 102 through a Host-PCI bridge, and subordinate PCI buses are those coupled through appropriate PCI-PCI bridges as previously described. Subordinate buses may be located on the motherboard itself, and any number may be coupled through PCI-PCI bridges located on PCI adapter cards plugged into the PCI slots S1–S6, such as the PCI-PCI bridge 206 of the PCI adapter card 200, for example.

After all PCI buses are identified at step 502, operation proceeds to step 504 where all of the PCI buses are numbered in consecutive order. Such numbering begins with the primary PCI bus 112 and all of its subordinate PCI buses, then proceeds to the secondary PCI bus 120 and all of its subordinates, and then to any other host PCI buses in consecutive and ascending order. The primary PCI bus 112 is preferably given a number of zero (0). Then, any subordinate PCI buses "behind" or coupled through the primary PCI bus 112 are numbered in consecutive and increasing order. For example, if three (3) separate PCI adapter cards are plugged into the PCI slots S1, S2 and S3, respectively, where each PCI adapter card includes a PCI-PCI bridge and one subordinate PCI bus in a similar manner as the PCI adapter card 200, then the respective subordinate PCI buses coupled through the PCI slots S1, S2 and S3 are numbered one (1), two (2) and three (3), respectively. It is noted that if a PCI adapter card similar in configuration as the PCI adapter card 220 is present, then the local host bus, such as the host PCI bus 228, is considered an extension of the actual host PCI bus and is not separately numbered.

After the subordinate PCI buses, if any, behind the primary PCI bus 112 are numbered, then the secondary PCI bus 120 is assigned the next consecutive number. In this manner, the number assigned to the secondary PCI bus 120 depends upon the number of subordinate PCI buses behind the primary PCI bus 112. In the example provided above, the secondary PCI bus 120 is assigned the number four (4). Then, all of the subordinate PCI buses, if any, behind the secondary PCI bus 120 are numbered in a similar manner. For example, if two PCI adapter cards similar in configuration as the PCI adapter card 200 are plugged into any two of the PCI slots S4–S6, then the corresponding subordinate PCI buses are numbered five (5) and six (6), respectively. The procedure of numbering PCI buses continues in this manner for any other host PCI buses until all PCI buses of the computer system 100 are numbered.

Operation then proceeds to next step 506, which indicates that mapping of the PCI devices coupled to each of the PCI buses identified and numbered at steps 502 and 504 begins at the address (FEBFFFFFh) just below the memory segment 302. Operation proceeds to next step 508, where a count value HOSTBUS is set equal to the number assigned to the highest numbered PCI bus of all PCI buses, including all subordinate PCI buses. In the example above with five PC adapter cards and a total of seven (7) PCI buses, HOSTBUS is set equal to six (6). At next step 510, another count value CURBUS is set equal to HOSTBUS. At next step 512, the non-prefetchable memory associated with all of the PCI devices coupled to the PCI bus numbered CURBUS is allocated and initialized in the memory space just below the previously allocated space in memory. For the first iteration, this is the memory space just below the memory segment 302. The PCI devices coupled to any particular PCI bus may be handled in any desired order.

At next step 512, the non-prefetchable memory is mapped for all PCI devices associated with the current PCI bus as identified by CURBUS. For each PCI device, the CPU1 104 determines the amount of non-prefetchable memory required for that device from the device's id register, subtracts the amount of space (in bytes) from the previously allocated address in PCI space, assigns an address value to the PCI device, and then programs the assigned address value into the PCI device. In this manner, the non-prefetchable memory space is between the lower, assigned address and the upper, previously allocated address. This procedure effectively allocates and initializes the PCI non-prefetchable memory for each device of the current PCI bus. At next step 514, the CURBUS count value is decremented to identify the next PCI bus in reverse order. At next step 516, it is queried whether all of the non-prefetchable memory for all of the PCI devices coupled to any and all subordinate buses and the associated and current host PCI bus has been allocated and initialized. If not, operation returns to step 512 to determine, allocate and initialize the non-prefetchable memory for all PCI devices of the next PCI bus. In this manner, operation loops between steps 512, 514 and 516 until any and all of the non-prefetchable memory for any PCI devices of the current host PCI bus and its subordinate PCI buses is mapped.

For example, suppose two PCI adapter cards are plugged into the slots S4 and S5, referred to as PCI card A and PCI card B, respectively, where both cards are implemented in a similar manner as the PCI adapter card 200. Also, suppose that a third PCI adapter card is plugged into the PCI slot S6, but is implemented in a similar manner as the PCI adapter card 220, which is referred to as PCI card C. Also suppose one PCI device is associated with each of the PCI cards A, B and C, and that each PCI device A, B and C, respectively, has 256 bytes (100h) of non-prefetchable memory. If the subordinate PCI bus of the PCI card B is the highest numbered bus, then the non-prefetchable memory of device B of the PCI card B is mapped first between addresses FEBFFF00h and FEBFFFFFh inclusive, and given a starting address of FEBFFF00h. Then, CURBUS is decremented and the non-prefetchable memory of device A of PCI card A is mapped second between addresses FEBFFE00h and FEBFFEFFh inclusive, and given a starting address of FEBFFE00h. Since the PCI device C is coupled to the secondary PCI bus 120, its non-prefetchable memory is mapped last between addresses FEBFFD00h and FEBFFD-FFh inclusive, and given a starting address of FEBFFD00h. FIG. 3B provides a graphical illustration of the relative mapping according to this example.

After all of the non-prefetchable memory is allocated and initialized for a given host PCI bus and its subordinate PCI buses as determined at step 516, operation proceeds to step 518, where CURBUS is set equal to HOSTBUS. HOSTBUS is the highest numbered PCI bus of the same host PCI bus just completed for non-prefetchable memory, so that the prefetchable memory is now mapped for the same devices beginning at an address just below the previously allocated non-prefetchable memory space. Operation proceeds to next step 520, where the prefetchable memory is mapped for all PCI devices associated with the current PCI bus as identified by CURBUS. Step 520 is very similar to step 512, except that the prefetchable memory is now allocated and initialized. Thus, for each PCI device, the CPU1 104 determines the amount of prefetchable memory required for that device from the device's id register, subtracts the amount of space (in bytes) from the previously allocated address in PCI space, assigns an address value to the PCI device, and then programs the assigned address value into the PCI device.

The next two steps 522 and 524 are similar to the steps 514 and 516, where CURBUS is decremented at step 522, and then at step 524 it is queried whether all of the prefetchable memory for all of the PCI devices coupled to any and all subordinate buses and the associated current host PCI bus has been allocated and initialized. If not, operation returns to step 520 to determine, allocate and initialize the prefetchable memory for all PCI devices of the next PCI bus. In this manner, operation loops between steps 520, 522 and 524 until any and all of the prefetchable memory for any PCI devices of the current host PCI bus and its subordinate PCI buses is mapped.

To continue the example provided above, suppose that each of the PCI devices A, B and C of the PCI adapter cards A, B and C, respectively, each have 1 MB of prefetchable memory to be mapped. The prefetchable memory of Device B of the PCI card B is mapped first between addresses FEAFFD00h and FEBFFCFFh inclusive, and given a starting address of FEAFFD00h. The prefetchable memory of Device A of the PCI card A is mapped second between addresses FE9FFD00h and FEAFFCFFh inclusive, and given a starting address of FE9FFD00h. Finally, the prefetchable memory of Device C of the PCI card C is mapped between addresses FE8FFD00h and FE9FFCFFh inclusive, and given a starting address of FE8FFD00h. FIG. 3B provides a graphical illustration of the relative mapping according to this example.

After all of the prefetchable memory is mapped for a given host peer PCI bus as determined in step 524, operation proceeds to step 526, where it is queried whether the PCI memory of all devices for all of the PCI buses have been mapped. If not, operation proceeds to step 528 where HOSTBUS is set equal to CURBUS. Recall that CURBUS was decremented at step 522 and if the mapping of the current host PCI bus was completed, then CURBUS is now equal to the highest numbered subordinate bus, if any, of the next lower numbered host PCI bus. In the example above where the secondary PCI bus 120 (bus number 4) has just been completed and where the there are 3 PCI adapter cards providing 3 subordinate PCI buses behind the primary PCI bus 112, CURBUS has been decremented to 3, which is the number of the highest subordinate PCI bus of the primary PCI bus 112. Operation proceeds to complete the PCI memory mapping for the primary PCI bus 112 and the subordinate PCI buses behind it. If all of the PCI buses have been mapped as determined in step 526, then the PCI memory is mapped and operation is completed.

Figure 6:
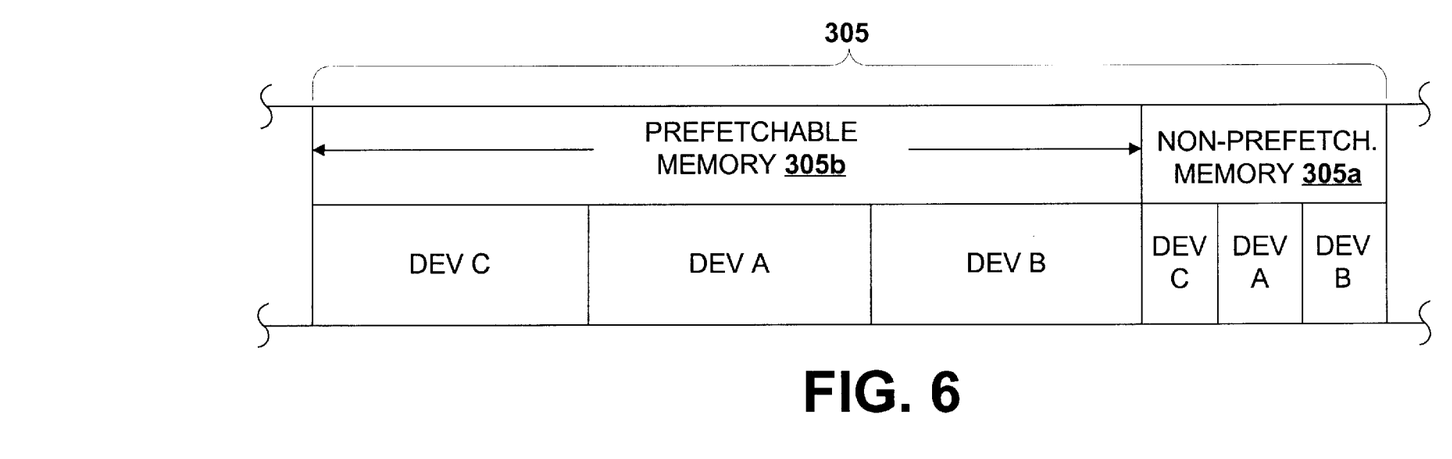
FIG. 6 is a representative graphic diagram illustrating an example of the mapping according to the flowchart of FIG. 5.

FIG. 6 is a representative graphic diagram illustrating the preferred mapping of the PCI memory segment 305 corresponding to the secondary PCI bus 120, which mapping is representative of the mapping of the preferred mapping of the memory segments 304, 305 and for any other host PCI buses of the computer system 100. As will be described more fully below, the non-prefetchable memory of three PCI devices (DEV A, B and C) coupled through the secondary PCI bus 120, including all of the devices of the subordinate PCI buses of the secondary PCI bus 120, is grouped together and mapped first in a memory section 305a within the memory segment 305, followed by the prefetchable memory for the same devices mapped in a memory section 305b within the memory segment 305. In this manner, the non-prefetchable memory coupled through a given host PCI bus, including subordinate buses coupled thereto, is grouped and mapped together in a first section within a corresponding segment, followed by the corresponding prefetchable memory in a second section of the segment in descending order.

It is appreciated that the PCI memory mapping procedure described herein is performed in descending and reverse order, which is opposite the typical PCI memory mapping procedure. In the typical mapping scheme, PCI memory is mapped beginning at address C0000000h and beginning with the PCI devices of the primary PCI bus and mapped upwards in ascending memory and in increasing consecutive number of the PCI buses. A mapping according to the present invention allows the PCI memory space to be placed at the upper end of the memory just below the memory segment 302 allocated for the system ROM 144 and any APICs 146, which results in determination of a maximum system memory address 312 just below the memory allocated for the last PCI device of the primary PCI bus. Even if such mapping were not performed in an efficient manner, such as if there were no distinction made between prefetchable and non-prefetchable memory, a descending and reverse order mapping would still result in memory savings and more efficient memory utilization. Employing efficient PCI memory mapping according to the present invention, substantial memory savings and efficient memory utilization are achieved.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A computer system, comprising:

a host bus;

a processor coupled to said host bus that asserts addresses between a lowest address and a highest address;

at least one peripheral component interconnect (PCI) bus coupled to said host bus;

at least one PCI device coupled to said at least one PCI bus having memory that is mapped in reverse and descending order in PCI memory, said PCI memory being located between a predetermined upper PCI memory address and an upper system memory address located below said upper PCI memory address; and system memory devices coupled to said host bus mapped between said lowest address and said upper system memory address.

2. The computer system of claim 1, further comprising:

said lowest and highest addresses defining four gigabytes of memory space;

an expansion bus coupled to said at least one PCI bus; and a non-volatile memory device and interrupt logic coupled to said expansion bus mapped between said highest address and said predetermined upper PCI memory address.

3. The computer system of claim 1, further comprising:

said at least one PCI bus including a primary host PCI bus and a secondary host PCI bus; and said at least one PCI device comprising a plurality of PCI devices each coupled to one of said primary host PCI bus and said secondary host PCI bus, said memory of PCI devices coupled to said secondary host PCI bus being mapped in a first segment of said PCI memory, and said memory of PCI devices coupled to said primary host PCI bus being mapped in a second segment in said PCI memory located below said first segment.

4. The computer system of claim 3, further comprising:

at least one of said plurality of PCI devices including non-prefetchable and prefetchable memory, wherein for each of said primary and secondary host PCI buses, said non-prefetchable memory of corresponding PCI devices is mapped together and said prefetchable memory of said corresponding PCI devices is mapped together.

5. The computer system of claim 4, further comprising:
said non-prefetchable memory being mapped above said prefetchable memory.

6. The computer system of claim 3, further comprising:
a first host-PCI bridge that couples said primary host PCI bus to said host bus; and
a second host-PCI bridge that couples said secondary host PCI bus to said host bus.

7. The computer system of claim 1, further comprising:
said at least one PCI bus including:
a primary host PCI bus;
a primary subordinate PCI bus coupled behind said primary host PCI bus: and
a secondary host PCI bus; and
said at least one PCI device comprising a plurality of PCI devices each coupled to one of said primary host PCI bus, said primary subordinate PCI bus and said secondary host PCI bus, said memory of PCI devices coupled to said secondary host PCI bus being mapped in a first segment of said PCI memory, and said memory of PCI devices coupled to said primary host PCI bus and said primary subordinate PCI bus being mapped in a second segment in said PCI memory located below said first segment.

8. The computer system of claim 7, further comprising:
at least one of said plurality of PCI devices including non-prefetchable and prefetchable memory, wherein for said secondary host PCI bus and for both of said primary host and said primary subordinate PCI buses, said non-prefetchable memory of corresponding PCI devices is mapped together and said prefetchable memory of said corresponding PCI devices is mapped together.

9. The computer system of claim 8, further comprising:
within said second segment, non-prefetchable memory of PCI devices coupled to said primary subordinate PCI bus is mapped first, non-prefetchable memory of PCI devices coupled to said primary host PCI bus is mapped second, prefetchable memory of PCI devices coupled to said primary subordinate PCI bus is mapped third and prefetchable memory of PCI devices coupled to said primary host PCI bus is mapped fourth in descending order.

10. The computer system of claim 7, further comprising:
said at least one PCI bus further including a second subordinate PCI bus coupled behind said secondary host PCI bus; and
said plurality of PCI devices each coupled to one of said primary and secondary host PCI buses and said primary and second subordinate PCI buses, said memory of PCI devices coupled to said secondary host and said second subordinate PCI buses being mapped in a first segment of said PCI memory, and said memory of PCI devices coupled to said primary host and said primary subordinate PCI buses being mapped in a second segment in said PCI memory located below said first segment.

11. The computer system of claim 10, further comprising:
at least one of said plurality of PCI devices including non-prefetchable and prefetchable memory, wherein for both of said secondary host and second subordinate PCI buses and for both of said primary host and said primary subordinate PCI buses, said non-prefetchable memory of corresponding PCI devices is mapped together and said prefetchable memory of said corresponding PCI devices is mapped together.

12. The computer system of claim 11, further comprising:
within said first segment, non-prefetchable memory of PCI devices coupled to said second subordinate PCI bus is mapped first, non-prefetchable memory of PCI devices coupled to said secondary host PCI bus is mapped second, prefetchable memory of PCI devices coupled to said second subordinate PCI bus is mapped third and prefetchable memory of PCI devices coupled to said secondary host PCI bus is mapped fourth in descending order; and
within said second segment, non-prefetchable memory of PCI devices coupled to said primary subordinate PCI bus is mapped first, non-prefetchable memory of PCI devices coupled to said primary host PCI bus is mapped second, prefetchable memory of PCI devices coupled to said primary subordinate PCI bus is mapped third and prefetchable memory of PCI devices coupled to said primary host PCI bus is mapped fourth in descending order.

13. The computer system of claim 10, further comprising:
a first host-PCI bridge that couples said primary host PCI bus to said host bus;
a second host-PCI bridge that couples said secondary host PCI bus to said host bus;
a first PCI-PCI bridge that couples said primary subordinate PCI bus to said primary host PCI bus; and
a second PCI-PCI bridge that couples said second subordinate PCI bus to said secondary host PCI bus.

14. A computer system, comprising:
a host bus;
a processor coupled to said host bus that asserts addresses between a lowest address and a highest address defining at least 4 gigabytes of memory area;
a plurality of host peripheral component interconnect (PCI) buses including a primary host PCI bus, each coupled to said host bus via a corresponding host-PCI bridge;
a plurality of subordinate PCI buses, each coupled to one of said plurality of host PCI buses via a corresponding PCI-PCI bridge;
a plurality of PCI devices, each coupled to one of said plurality of host and subordinate PCI buses and each having associated memory, said associated memory of each of said plurality of PCI devices being mapped in descending order in said memory area beginning at a predetermined upper PCI memory address and ending at a lower PCI address below said predetermined upper PCI memory address, and starting with a highest numbered PCI host bus and its subordinate PCI buses, if any, and continuing in reverse order of said plurality of PCI host buses and ending with said primary host PCI bus and its subordinates, if any; and
system memory devices coupled to said host bus mapped between said lowest address and said upper system memory address.

15. The computer system of claim 14, further comprising:
said associated memory including non-prefetchable memory and prefetchable memory; and
for each one of said plurality of host PCI buses, said non-prefetchable memory of any PCI devices coupled to any subordinate PCI buses behind said one of said plurality of host PCI buses being mapped first, said non-prefetchable memory of any PCI devices coupled said one of said plurality of host PCI buses being mapped second, said prefetchable memory of said any PCI devices coupled to said any subordinate PCI buses behind said one of said plurality of host PCI buses being mapped third and said prefetchable memory of said any PCI devices coupled to said one of said plurality of host PCI buses being mapped last.

16. A method of mapping a memory system of a computer having a host bus and a predetermined memory space with a lowest address and a highest address, comprising steps of:

identifying all peripheral component interconnect (PCI) buses coupled through the host bus of the computer including any host PCI buses and any subordinate PCI buses coupled behind the host PCI buses;

enumerating the PCI buses; and allocating and initializing the memory of each PCI device coupled to the PCI buses within a PCI memory location starting with the highest numbered PCI host bus and its subordinate PCI buses, if any, and continuing in reverse order of PCI host buses and ending with a primary host PCI bus and its subordinates, and progressing in descending order in the PCI memory location beginning at an upper PCI memory address below the highest address and ending at a lower PCI address below the upper PCI memory address.

17. The method of claim 16, wherein said step of allocating and initializing further comprises a step of:

for each host PCI bus, allocating the memory of PCI devices coupled to any subordinate PCI buses first followed by the memory of PCI devices coupled to the corresponding host PCI bus.

18. The method of claim 17, wherein said step of allocating and initializing further comprises a step of:

for each host PCI bus and its subordinate PCI buses, if any, allocating non-prefetchable memory first followed by prefetchable memory.

19. The method of claim 16, prior to said step of allocating and initializing, further comprising steps of:

mapping at least one system device in the topmost portion of the memory space between the highest address and a lower address below the highest address; and determining the upper PCI memory address as the next address below the lower address of the at least one system device.

20. The method of claim 16, after said step of allocating and initializing, further comprising a step of:

mapping system memory between the lowest address and the lower PCI address of the memory space.

* * * * *